United States Patent [19]

Seki et al.

[11] Patent Number: 4,676,964

[45] Date of Patent: Jun. 30, 1987

[54] PROCESS FOR PURIFYING SILICA

[75] Inventors: Akira Seki; Yuuki Narita, both of Funabashi; Yoshio Aso, Chiba; Shunro Nagata, Tokyo, all of Japan

[73] Assignee: Kawatetsu Mining Company, Ltd., Tokyo, Japan

[21] Appl. No.: 857,376

[22] Filed: Apr. 30, 1986

[30] Foreign Application Priority Data

Oct. 8, 1985 [JP] Japan ................................ 60-222628

[51] Int. Cl.$^4$ ............................................. C01B 33/12
[52] U.S. Cl. .................................... 423/335; 423/338; 423/334; 423/340
[58] Field of Search ................ 423/338, 335, 334, 340

[56] References Cited

U.S. PATENT DOCUMENTS

| | | | |
|---|---|---|---|
| 2,829,030 | 4/1958 | Habernickel | 423/334 |
| 3,959,174 | 5/1976 | Winyall et al. | 423/338 |
| 4,401,638 | 8/1983 | Caballero et al. | 423/340 |

FOREIGN PATENT DOCUMENTS

| | | | |
|---|---|---|---|
| 0159539 | 3/1983 | Fed. Rep. of Germany | 423/335 |
| 4025417 | 9/1969 | Japan | 423/240 |
| 0239329 | 11/1985 | Japan | 423/338 |
| 0874621 | 10/1981 | U.S.S.R. | 423/338 |

*Primary Examiner*—John F. Niebling
*Assistant Examiner*—Lori S. Freeman
*Attorney, Agent, or Firm*—Sherman and Shalloway

[57] ABSTRACT

This invention concerns a process for purifying silica produced from an alkali silicate aqueous solution, which usually contains more than 200 ppm of impurities, to silica containing less than 30 ppm of impurities. Concretely, the purification process of silica comprises: dispersing silica gel, containing a lot of impurities, in water and filtering the solution; dispersing the filtered out silica gel again in an aqueous solution of pH 2 or less and filtering the aqueous solution; putting the silica gel to heat-treatment and acid-treatment with continuous stirring in order to break the inside siloxane link and dissolve out impurities therefrom and filtering the acid solution; rinsing a produced cake with pure water to wash away the inside residual solution and drying the cake.

7 Claims, No Drawings

4,676,964

PROCESS FOR PURIFYING SILICA

FIELD OF THE INVENTION

This invention concerns a purification process for silica containing impurities. More particularly, this invention concerns a process for purifying silica obtained from an alkali silicate solution, which usually contains more than 200 ppm of impurities, to highly purified silica containing less than 30 ppm of impurities. Recently, as silica has been increasingly used as functional, optical and electronic materials, such demands on silica as its purity, shape, size, and physical properties have almost become unable to be met with natural silica only. Hence, several kinds of artificial silica are produced by various processes and supplied for each different purpose.

DESCRIPTION OF THE PRIOR ART

Generally, artificial silica is divided into two types differing in purity. Silica gel and fine powder silica, which are produced from alkali silicate by way of silica gel by rinsing in water and drying, have low purity; fused silica glass, produced by the direct melting of natural quartz such as high purity silica, siliceous sand and quartz crystal, artificial silica glass, obtained from silicon tetrachloride, and artificial quartz crystal have high purity. So far there have been reported many processes for producing high purity silica, among which a purification process of dried silica gel by using a mineral acid takes the lead of others. With this purification process, however, impurities only on the outside of the silica gel particle are removed because the particle is in a stabilized condition although it contains impurities inside. Therefore, in spite of being called high purity silica, it contains as much as about 200 ppm of impurities even after the purification.

SUMMARY OF THE INVENTION

As stated above, silica gel and fine powder silica are not very pure; those produced by a conventional process contain about 200 ppm of Al, 50 ppm of Fe and 100 ppm of other alien elements as impurities. These silica products have no problem in particular when used in catalysis or as fillers, but they are difficult to put to uses requiring a specified physical or chemical property on a high purity level. Moreover, as long as fused silica glass is concerned, its production cost is comparatively easy to cut down on because the natural product is just melted as it is after simple rinsing in water and acid, but the content of impurities cannot be reduced so simply as expected. In this respect, fused silica glass produced by a conventional process by and large contains about 30 ppm of Al, 2 ppm of Fe, 3 ppm of Ti, 3 ppm of Mg, 1 ppm of K, 1 ppb of U and 1 ppb of Th. Therefore, if this is used as a filler in need of high purity, the above alien elements dissolve out therefrom and chemically affect the environment. For example, in optical use, the optical properties of the instrument are affected because the impurities have their own absorption bands. Moreover, if used as a material for semi-conductors, alpha-rays originating from such radioactive elements as uranium and thorium can cause the arise of haphazard errors in the software of programmed, controlled systems.

Incidentally, artificial silica glass, which is purer than fused silica glass, is produced from silicon tetrachloride, a by-product in the production process of high purity silicon for semi-conductors. Therefore, the content of each alien element is more or less 1 ppm and below; particularly in terms of uranium and thorium, their content is as small as 1 ppb or less. Hence, artificial silica glass is very expensive; it can certainly be put to special use, but cannot be put to general use.

Accordingly, it is an object of this invention to provide a purification process for producing high purity silica which can be used as a material for cheap and high purity silica glass. The object of this invention can be accomplished by a purification process, characterized in that silica gel obtained from an alkali silicate aqueous solution, having a lot of impurities, is dispersed in water and filtered out; the silica gel is dispersed again in an aqueous solution of pH 2 or less, filtered out, put to heat-treatment and acid-treatment with stirring in order to break siloxane link inside the silica gel and dissolve out impurities therefrom and then filtered out; a cake thus produced is rinsed with pure water to remove the residual acid solution and dried.

DESCRIPTION OF THE PREFERRED EMBODIMENTS

The structure of silica is built up of a three-dimensional combination of the siloxane link Si—O—Si and the silanol link Si—OH. Hence, in order to remove such alien elements, rinsing silica cannot be omitted at first; other than that, it is necessary to treat it in such a way that its siloxane link is weakened and then broken so as to expose them to the outside. In view of the above, the present inventors made various attempts and finally accomplished the invention based on the discovery that, as long as silica gel is used as a material, if as much impurities as possible are removed and the siloxane linkages are kept weakened in the pre-treatment including a few steps, then the following heat-treatment and acid-treatment with continuous stirring facilitate the removal of impurities from the inside of silica gel because the siloxane link, as well as the silica gel itself, are easily broken in the post-treatment.

That is, this invention relates to a purification proces for purifying silica, characterized in that silica gel obtained from an alkali silicate aqueous solution, having a lot of impurities, is dispersed in water and filtered out; the silica gel is dispersed again in an aqueous solution of pH 2 or less, filtered out, put to heat-treatment and acid-treatment with stirring in order to break siloxane links inside the silica gel and dissolve out impurities therefrom and then filtered out; a cake thus produced is rinsed with pure water to remove the residual acid solution and dried.

In this invention, there can be use as alkali silicate aqueous solution a solution which is prepared by adding an alkali metal salt of silicon dioxide with not less than 99% purity, heating the mixture and then adding water thereto, where said silicon dioxide is refined from a lower grade silicon dioxide with about 80% purity by way of rinsing in water, flotation and acid-treatment.

Also, in the case of obtaining silica gel from alkali silicate aqueous solution, there can be employed a mineral acid to acidify it to pH 6 and above to cause precipitation.

Commonly, silica gel obtained from an alkali silicate aqueous solution contains as impurities Na, K, Ca, Mg, Mn, etc. other than Al, Fe, Ti referred to above. When these alien elements are present outside or inside silica gel, other impurities are hindered from dissolving out therefrom in the impurity-removing process thereafter where the pH of the solution is lowered to 2 or less. Therefore, silica gel needs enough rinsing and filtering in a solution with pH from about neutrality through 9 that allows Na, K, Ca, Mg, Mn, etc. to keep the ion form therein. After filtration, water is added to the silica gel with stirring in order to disperse and make it a slurry with fluidity. The addition of mineral acids to the slurry thereafter not only helps impurities outside the silica gel to dissolve out but also serves to break the siloxane links near the surface, with the result that it facilitates the removal of impurities inside the silica gel. On account of this, it is desirable to add as much mineral acid as required to lower the pH to 2 or less so that as much impurities as possible can dissolve out in the form of the corresponding ions. But to assure their more rapid dissolution and prompt the breaking of more of the siloxane link, it is more desirable that the pH of the slurry be not higher than 1.20.

After the removal of impurities, the silica gel is rinsed and filtered sufficiently. If a trace of impurities, as ions, remain outside the silica gel, not only does its purity decrease as such, but also its surface becomes so stable as to prevent impurities from dissolving out and hinder mineral acid from permeating its inside in the subsequent acid-treatment since impurities are prone to form the compound $SiO_2 \cdot M^a O_b$ (b=0.5 a) on the surface in the subsequent heat-treatment.

In the heat-treatment and the acid-treatment of this invention, at first the silanol links outside the silica gel breaks and evaporates by heat, whereby its surface is activated; at the same time, water contained inside begins to evaporate, which forcibly breaks the gel in the end. Subsequently, an acid solution rapidly penetrates into the voids formed by stirring the water and the silanol link have left as they evaporate, which causes more portions of both the silica gel and the siloxane link inside to break, whereby impurities dissolve out from the inside and outside of the silica gel simultaneously.

The heat-resistant is carried out between ambient temperatures and 1100° C. It is undesirable that the heat-treatment is conducted above 1100° C. because silica gel particles sinter at these elevated temperatures. Silica gel treated with mineral acid has to be rinsed and filtered carefully with pure water in order to dissolve impurities and to prevent the mineral acid from clinging to or staying on the silica gel. The silica gel is finally dried above ambient temperatures and results in a high purity silica.

[EXAMPLE]

Added to 150 l of water were 2.7 kg of sodium silicate aqueous solution (37% $SiO_2$). After that, 1.2 l of 36% hydrochloric acid was put in the solution to make its pH 7.80. After being kept standing for 5 hours and then filtered, 50 kg of silica gel which contained 2.0% of silicon dioxide was obtained.

Fifty liters of water were added to the silica gel with stirring and then 700 ml of HCl were added to make the pH of the silica gel solution 1.10. An acid gel slurry formed; it was filtered, rinsed with water and filtered again, which contained 2.5% of silicon dioxide at this moment. It was kept standing in an electric furnace at 500° C. for 18 hours and put in 5 l of water; 1 l of HCl was added thereto. Rinsing and filtering with pure water were conducted. Finally, drying was made at 120° C. In this way, high purity silica was obtained. Alien elements found in the silica are shown below together with their content.

| (ppm) | | | | | | | (ppb) | |
|---|---|---|---|---|---|---|---|---|
| Al | Fe | Ti | K | Na | Ca | Mg | U | Th |
| 15 | <1 | 3 | <1 | <1 | <1 | <1 | <0.5 | <0.4 |

As is apparent from the above, according to this invention, silica containing more than 200 ppm of impurities can be refined to a high purity containing less than 30 ppm of impurities easily and economically. The high purity silica is expected to meet a variety of demands requiring highly pure physical or chemical properties in fields such as optics, electronics or high functional catalytic reactions. The silica is also able to be used as cheap, high purity silica glass, so that the effect of this invention is very great.

What is claimed is:

1. A process for producing high purity silica from silica gel obtained from an aqueous solution of alkali silicate, said starting silica gel including at least 200 ppm of metallic impurities, said process comprises
    (a) dispersing the silica gel in water;
    (b) filtering the resulting dispersion from step (a);
    (c) redispersing the silica gel filtered out in step (b) in an aqueous solution at a pH of 2 or less;
    (d) filtering the resulting dispersion from step (c);
    (e) heat-treating and acid-treating the silica gel filtered out in step (d) with stirring whereby siloxane links inside the silica gel are broken and metallic impurities in the silica gel are dissolved in the acid treating medium;
    (f) filtering the heat-treated and acid-treated silica gel from step (e) to filter out said dissolved impurities and form a cake;
    (g) rinsing said cake with pure water to remove residual acid treating medium; and
    (h) drying the rinsed cake; whereby silica gel containing less than about 30 ppm of said metallic impurities is obtained.

2. The process of claim 1 wherein in step (c) silica gel is dispersed in an aqueous medium at a pH not higher than 1.2.

3. The process of claim 1 wherein the heat-treatment in step (e) is at a temperature up to about 1100° C.

4. The process of claim 3 wherein the acid treatment in step (e) is with mineral acid.

5. The process of claim 1 wherein the starting aqueous solution of alkali silicate is prepared by adding an alkali metal salt to silicon dioxide having a purity of not less than 99%, heating the resulting mixture and adding water thereto.

6. The process of claim 5 wherein the silicon dioxide is produced by refining a lower grade silicon dioxide having a purity of about 80% by the steps of rinsing, flotation and acid-treatment.

7. A process for producing silica gel containing less than about 30 ppm of metallic impurities from silica gel containing more than about 200 ppm of metallic impurities which comprises
    forming an acid gel slurry of silica by stirring wet silica gel obtained from water glass and containing more than about 200 ppm of impurities in water at a pH of no more than 2,
    rinsing the acid gel slurry with water to remove some of said impurities;
    drying the rinsed gel; and
    dissolving and rinsing the dried gel in an acidic medium at an elevated temperature to remove additional impurities to thereby obtain silica gel containing no more than about 30 ppm of metallic impurities.

* * * * *